(12) United States Patent
Hosokawa et al.

(10) Patent No.: US 10,053,053 B2
(45) Date of Patent: Aug. 21, 2018

(54) OCCUPANT DECISION DEVICE FOR VEHICLE

(71) Applicants: DENSO CORPORATION, Kariya, Aichi-pref. (JP); HONDA MOTOR CO., LTD., Tokyo (JP)

(72) Inventors: Toshio Hosokawa, Kariya (JP); Yusuke Muramatsu, Wako (JP)

(73) Assignees: DENSO CORPORATION, Kariya, Aichi-pref. (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/273,451

(22) Filed: Sep. 22, 2016

(65) Prior Publication Data

US 2017/0088097 A1 Mar. 30, 2017

(30) Foreign Application Priority Data

Sep. 25, 2015 (JP) .................. 2015-188299

(51) Int. Cl.
*B60Q 1/00* (2006.01)
*B60R 22/48* (2006.01)
*B60N 2/00* (2006.01)
*B60R 21/015* (2006.01)

(52) U.S. Cl.
CPC .............. *B60R 22/48* (2013.01); *B60N 2/002* (2013.01); *B60R 21/01516* (2014.10); *B60R 21/01546* (2014.10); *B60R 21/01556* (2014.10); *B60R 2022/4816* (2013.01); *B60R 2022/4858* (2013.01)

(58) Field of Classification Search
CPC ............ B60R 22/48; B60R 2022/4816; B60R 2022/4858
See application file for complete search history.

(56) References Cited

U.S. PATENT DOCUMENTS

| | | | | |
|---|---|---|---|---|
| 6,264,236 B1* | 7/2001 | Aoki | ....................... | B60N 2/002 180/268 |
| 6,536,797 B1* | 3/2003 | Reich | ................ | B60R 21/01512 180/273 |
| 7,466,221 B1* | 12/2008 | Lehr | .................... | B60N 2/2812 340/457.1 |
| 9,676,325 B1* | 6/2017 | Duan | ....................... | B60Q 9/00 |
| 9,884,574 B2* | 2/2018 | Mizoi | ....................... | B60N 2/80 |
| 2002/0024257 A1* | 2/2002 | Fujimoto | .......... | B60R 21/01516 307/10.1 |

(Continued)

*Primary Examiner* — Quang D Pham
(74) *Attorney, Agent, or Firm* — Knobbe, Martens, Olson & Bear, LLP

(57) ABSTRACT

Load sensors are disposed on four corners of a seat cushion. An occupant decision section of an occupant detection ECU decides a type of an occupant on a vehicle seat based on loads detected by the load sensors. A CRS changing section that prohibits the occupant decision section from changing a decision to a decision result that an adult is seated in the vehicle seat and changes the decision to a decision result that a child seat is attached on the vehicle seat when an engagement of a tongue plate with a buckle of a seat belt device is detected by a buckle switch and a buckle load calculated by buckle load calculation section is less than a predetermined buckling load threshold in a case where the occupant decision section decides that an adult is seated in the vehicle seat.

5 Claims, 10 Drawing Sheets

(56) References Cited

U.S. PATENT DOCUMENTS

| | | | |
|---|---|---|---|
| 2003/0025310 A1* | 2/2003 | Jitsui | B60R 21/01516 280/735 |
| 2004/0238231 A1* | 12/2004 | Nagai | G01G 19/4142 177/144 |
| 2007/0061102 A1* | 3/2007 | Kim | B60R 21/01516 702/173 |
| 2008/0012276 A1* | 1/2008 | Sugawara | G01G 19/4142 280/735 |
| 2008/0134797 A1* | 6/2008 | Nakano | B60N 2/002 73/781 |
| 2009/0094807 A1* | 4/2009 | Sugimoto | B60R 22/03 24/589.1 |
| 2011/0010037 A1* | 1/2011 | Inayoshi | B60N 2/002 701/31.4 |
| 2011/0010056 A1* | 1/2011 | Inayoshi | B60N 2/002 701/45 |
| 2013/0218487 A1* | 8/2013 | Fujii | B60N 2/002 702/41 |
| 2014/0035335 A1* | 2/2014 | Akutsu | B60N 2/002 297/217.2 |
| 2014/0265475 A1* | 9/2014 | Fujii | B60N 2/44 297/217.1 |
| 2014/0277948 A1* | 9/2014 | Fujii | B60R 22/48 701/45 |
| 2014/0309035 A1* | 10/2014 | Crawford | A63F 13/803 463/36 |
| 2015/0175111 A1* | 6/2015 | Muramatsu | B60R 21/01516 702/150 |
| 2016/0096498 A1* | 4/2016 | Kubota | B60R 21/01546 73/1.15 |
| 2016/0121848 A1* | 5/2016 | Seibert | B60N 2/002 340/457 |
| 2016/0375850 A1* | 12/2016 | Hosokawa | B60R 21/01516 701/45 |

* cited by examiner

OCCUPANT DECISION DEVICE FOR VEHICLE

CROSS-REFERENCE TO RELATED APPLICATION

This application is based on and claims the benefit of priority from earlier Japanese Patent Application No. 2015-188299 filed Sep. 25, 2015, the description of which is incorporated herein by reference.

TECHNICAL FIELD

The present disclosure relates to an occupant decision device for a vehicle that decides a type of an occupant on a vehicle seat.

BACKGROUND

In order to actuate occupant protection devices such as an air bag device or a seat belt pre-tensioner, there is a conventional technology relating to an occupant decision device for a vehicle (hereinafter referred to as an occupant decider) that decides a type of an occupant on a vehicle seat (refer to JP5531471, for example).

In such an occupant decider, it is decided if a vehicle seat is vacant, a state in which a child seat is secured, a state in which a small-build adult is seated, or a state in which a large-build adult is seated, for example, in order to decide an actuation of the occupant protection devices.

Hereinafter, these states of the vehicle seat that are decided by the occupant decider are comprehensively referred to as a type of an occupant.

The occupant decider disclosed in the conventional technology described above has a pair of load sensors disposed on right and left sides of a support portion of the vehicle seat, and decides the type of the occupant on the vehicle seat based of detected values of the load sensors.

Furthermore, the occupant decider calculates a left-right difference load value by subtracting a detected value of one of the load sensors from another detection value of another one of the load sensors.

Then, defining that an absolute value of the left-right difference load value when a buckle of a seat belt device is engaged as a reference value, it is decided that the child seat is attached to the vehicle seat when the absolute value of the left-right difference load value is reduced by a predetermined value from the reference value.

Usually, the detected values of the load sensors increase due to the child seat being tightened strongly by a webbing of the seat belt device when attaching the child seat to the vehicle seat.

In contrast, in the occupant decider according to the conventional technology described above, an erroneous decision that an adult is seated in the vehicle seat can be prevented from occurring in spite of the detection values of the load sensors are increased when the child seat is attached on the vehicle seat.

However, in the occupant decider according to the conventional technology described above, the left-right difference load values on the vehicle seat are calculated, and it is decided that the child seat is attached to the vehicle seat when the absolute value of the left-right difference load value is reduced by the predetermined value from the reference value.

Therefore, there are problems that the calculation for deciding the type of occupant on the vehicle seat becomes complicated, and the time required for calculation is disadvantageously increased.

Further, since errors of the detection values of the pair of the load sensors are accumulated during the calculation, there is a problem that accuracy in deciding the type of the occupant is lowered.

SUMMARY

An embodiment provides an occupant decision device for a vehicle that can accurately decide a type of an occupant on a vehicle seat.

An occupant decision device for a vehicle that has a vehicle seat provided with a seat belt device of which one end is fixed to a vehicle floor, the occupant decision device in a first aspect includes a plurality of load detecting bodies that respectively detect seat loads of a left portion and a right portion of the seat, and an occupant decision section that decides a type of occupant on the vehicle seat from at least one of a state where the vehicle seat is vacant, a state where a child seat is attached, or a state where an adult is seated based on the seat loads detected by the load detecting bodies, and maintains or changes a decision result of the type of the occupant.

The occupant decision device further includes a seat belt wearing detection body that detects a tongue of the seat belt device being engaged with a buckle, a buckle load calculation section that calculates a buckle load, which is a load of a side where the buckle is disposed in the portion of the seat, based on the seat loads detected by the load detecting bodies, and a child decision section that prohibits the occupant decision section from changing a decision to a decision result that an adult is seated in the vehicle seat and changes the decision to a decision result that the child seat is attached on the vehicle seat when an engagement of the tongue with the buckle is detected by the seat belt wearing detection body and the buckle load calculated by the buckle load calculation section is less than a predetermined buckling load threshold in a case where the occupant decision section decides that an adult is seated in the vehicle seat based on the seat loads detected by the load detecting bodies.

According to the present configuration, even if the child seat is attached on the vehicle seat and the seat loads detected by the load detecting bodies are increased, the occupant decision section is prevented from erroneously deciding that an adult is seated in the vehicle seat.

That is, after the child seat is secured on the vehicle seat, a webbing of the seat belt device engaged with the child seat will be pulled upward by a retractor in a direction where slack is eliminated.

Therefore, on the left and right sides of the seat, the seat load of a side where the buckle of the seat belt device is present is reduced.

Therefore, by detecting a decrease of the buckle side seat load and the engagement of the tongue with the buckle, it is possible to accurately decide that the child seat is attached on the vehicle seat.

A fact that an amount of decrease of the buckle side seat load that occurs after the child seat is attached on the vehicle seat becomes larger as the child seat is tightened strongly by the webbing has been found empirically.

Further, the decision is changed to the decision result that the child seat is attached on the vehicle seat based on the engagement of the tongue and the buckle, and the buckle load.

Thereby, it is not necessary to calculate the difference between right and left load values to decide the type of the occupant on the vehicle seat so that it is possible to shorten the calculation time, and errors of the detected value of the left and right load sensors can also be prevented from accumulating.

DETAILED DESCRIPTION OF THE PREFERRED EMBODIMENTS

In the following description, a presence or absence of an occupant BH shown in FIG. 3 on a vehicle seat 8, a presence or absence of a child seat 9 being secured, and a type of the occupant BH are referred to as the type of the occupant BH.

The child seat 9 corresponds to a seat designed for a child to use, and is hereinafter referred to as a CRS (Child Restraint System) 9.

Figure 1:
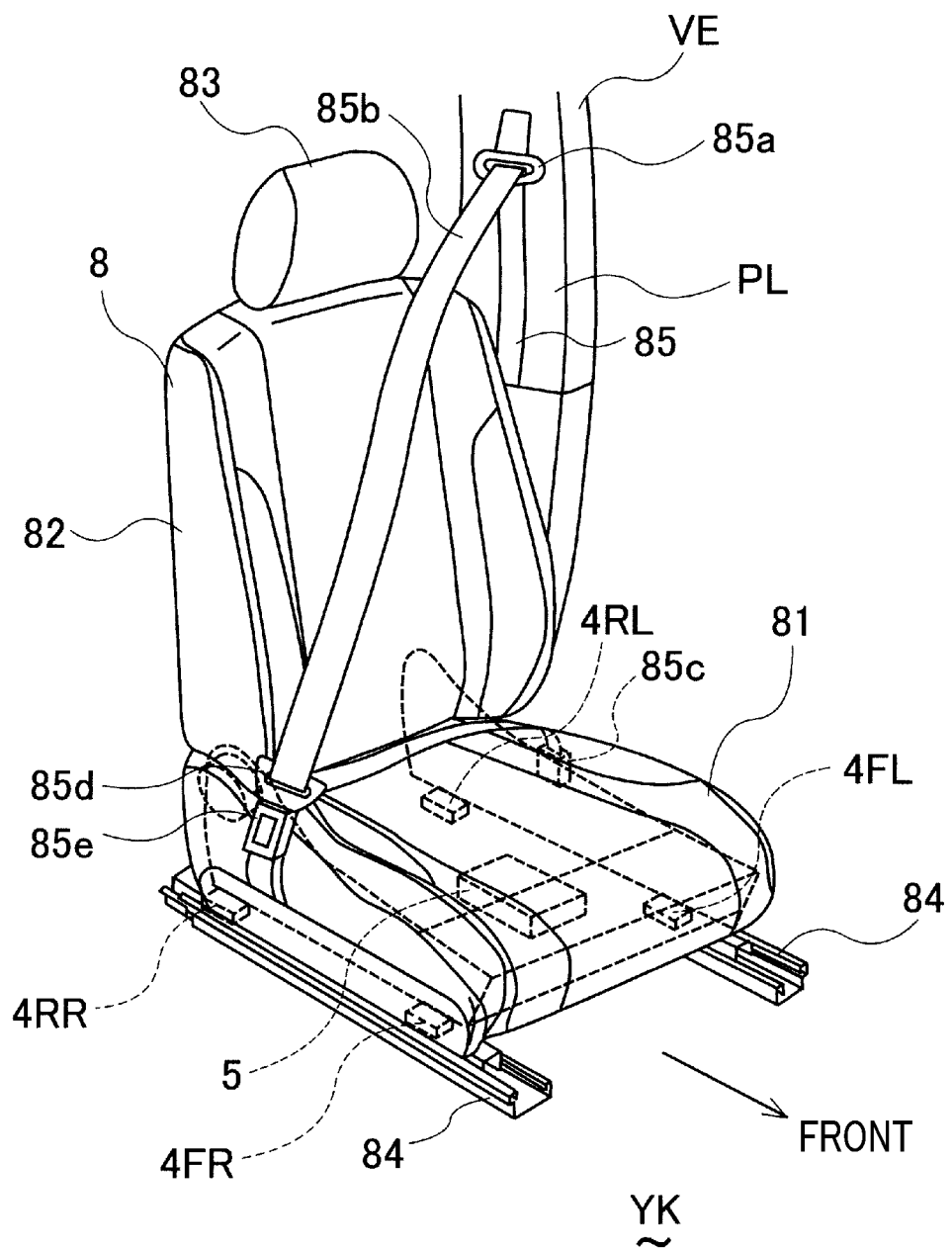
FIG. 1 shows a perspective view of a vehicle seat to which a type of an occupant is decided by an occupant decision device for a vehicle according to a first embodiment of the present disclosure.

In addition, in the description, a front for the occupant BH on the vehicle seat 8 is defined as a front of the vehicle seat 8. In FIG. 1, the front is indicated by an arrow.

Further, a right side of an arrow direction in FIG. 1 is defined as the right in the description, and a left side of the arrow direction is defined as the left in the description.

It should be noted that the following vehicle seat 8 is described as a front passenger's seat of a vehicle VE which is a right side steering wheel designed vehicle.

However, the occupant decision device 1 for the vehicle according to the first and second embodiments may also be applicable to a seat for a rear seat or to a second-row seat of three rows of seat regardless of the vehicle being a right side or left side steering wheel designed vehicle.

The occupant decision device 1 for a vehicle is hereinafter referred to as an occupant decider 1.

<Configuration of a First Embodiment>
[Configuration of a Vehicle Seat]

A configuration of a vehicle seat 8 will be described with reference to FIG. 1.

As shown in FIG. 1, the vehicle seat 8 for a passenger's seat mounted on a vehicle VE includes a seat cushion 81 where the occupant BH is seated and a seat back 82, which functions as a backrest for the occupant BH, attached pivotally in a back and forth direction at a rear end of the seat cushion 81. The seat cushion 81 corresponds to a seat.

Further, a headrest 83 for supporting a head of the occupant BH is attached at an upper end of the seat back 82.

A pair of left and right lower rails 84 is fixed on a floor YK of the vehicle VE.

The seat cushion 81 described above is engaged to each of the lower rail 84 movable in the back and forth direction.

A seatbelt device 85 provided in the vehicle seat 8 is a conventional three-point-support-type seat belt device, though it is not limited thereto.

The seat belt device 85 has a through anchor 85a swingably attached to an upper part of a center pillar PL of the vehicle VE, and the webbing 85b is movably inserted in the through anchor 85a.

An outer anchor d 85c is fixed to the floor YK so as to be positioned on the left side of the seat cushion 81, and one of end portions of the webbing 85b is connected to the outer anchor 85c. The floor YK corresponds to a vehicle floor.

Another one of end portions of the webbing 85b is drawn into the center pillar PL, and is connected to a retractor (not shown) incorporated in the center pillar PL.

Further, the webbing 85b is inserted through a tongue plate 85d, and the tongue plate 85d is formed engageable and disengageable relative to a buckle 85e attached to the right side of the seat cushion 81. The tongue plate 85d corresponds to a tongue.

The seat belt device 85 is formed so as to secure the occupant BH or the CRS 9 on the vehicle seat 8 by the webbing 85b by engaging the tongue plate 85d to the buckle 85e.

A load sensor 4FR and a load sensor 4RR are attached to a right end portion of the seat cushion 81 described above.

Further, a load sensor 4FL and a load sensor 4RL are attached to a left end portion of the seat cushion 81.

Hereinafter, the load sensor 4FR, the load sensor 4RR, the load sensor 4FL, and the load sensor 4RL are referred to as the load sensors 4FR to 4RL.

Each of the load sensors 4FR to 4RL corresponds to a load detecting body.

The load sensors 4FR, 4RR disposed at the right end portion of the seat cushion 81 are respectively attached to a front portion and a rear portion at the bottom of the seat cushion 81.

Further, the load sensors 4FL, 4RL disposed at the left end portion of the seat cushion 81 are respectively attached to a front portion and a rear portion at the bottom of the seat cushion 81.

Each of the load sensors 4FR to 4RL is formed of a strain gauge or the like.

The load sensors 4FR, 4RR disposed at the right end portion of the seat cushion 81 detect loads Wfr, Wrr that are responsible for the right portion of the seat cushion 81 among the loads generated by the occupant BH being seated, the attaching of the CRS 9, or placing a load on the vehicle seat 8.

On the other hand, the load sensor 4FL, 4RL disposed at the left end portion of the seat cushion 81 detect loads Wfl, Wrl that are responsible for the left portion of the seat cushion 81 among the loads generated in the vehicle seat 8.

Hereinafter, the loads Wfr, Wrr detected by the load sensors 4FR, 4RR and the loads Wfl, Wrl detected by the load sensors 4FL, 4RL are comprehensively referred to as the loads Wfr to Wrl. The loads Wfr to Wrl correspond to a seat load.

It should be noted that the sort, the type, and the detection principle of the load sensor 4FR to 4RL is not limited to specific ones in the present disclosure is.

Furthermore, as shown in FIG. 1, an occupant detection ECU 5 is disposed beneath the seat cushion 81. Details about the occupant detection ECU 5 will be described later.

[Overall Configuration and Functions of the Occupant Decider]

Figure 2:
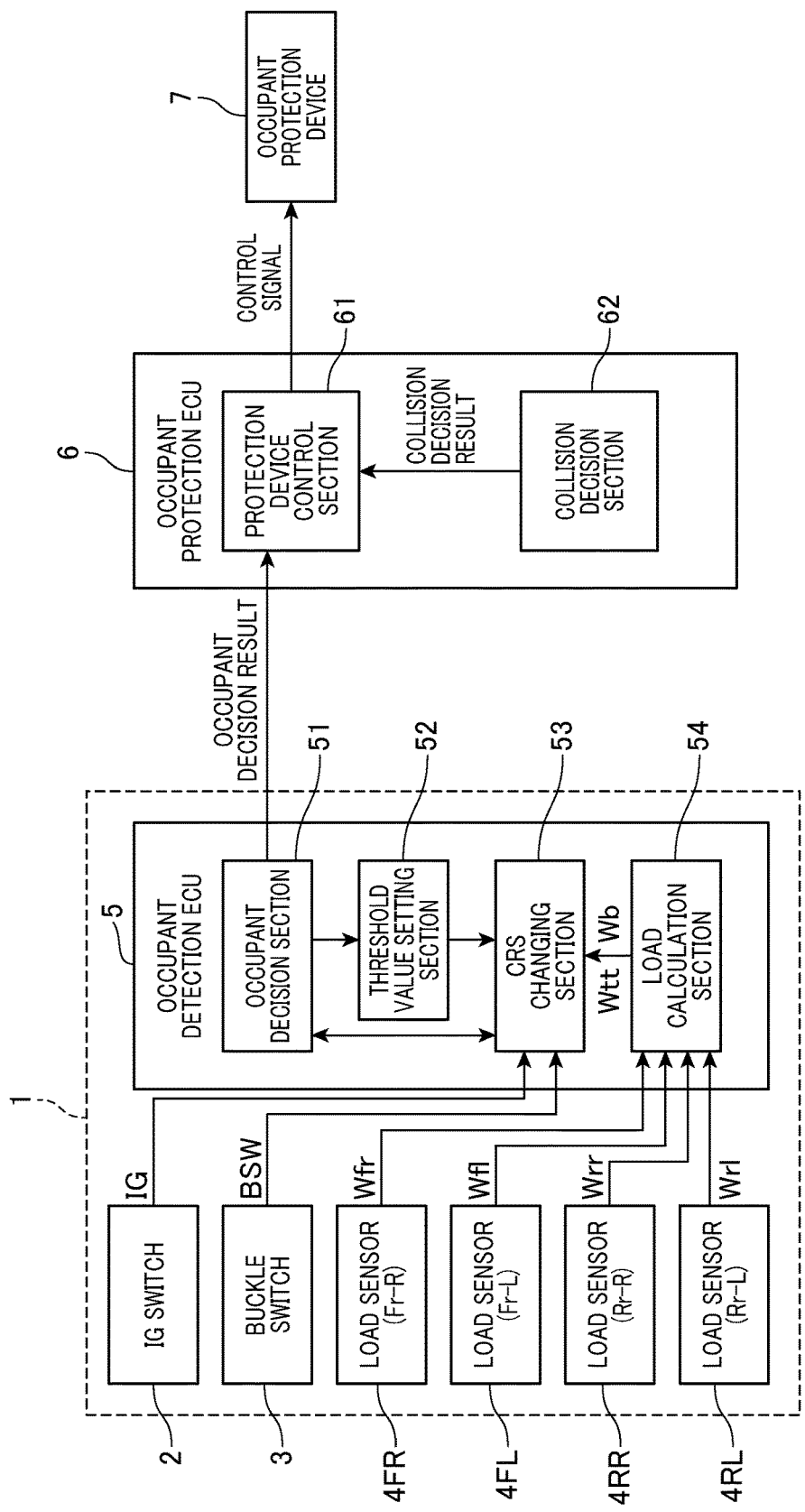
FIG. 2 shows a general block diagram of the occupant decision device for the vehicle that is connected to a passenger protection ECU.

Next, an overall configuration of the occupant decider 1 will be described with reference to FIG. 2.

An ignition switch 2 that starts the vehicle VE generates an IG signal by being turned on.

A buckle switch 3 is disposed in the above-described buckle 85e, and detects whether the tongue plate 85d and the buckle 85e are engaged for detecting whether the seat belt device 85 is attached by the occupant BH.

The buckle switch 3 corresponds to a seat belt wearing detection body.

The buckle switch 3 transmits a buckle signal BSW that indicates whether the tongue plate 85d and the buckle 85e are engaged.

The ignition switch 2, the buckle switch 3, and load sensors 4FR to 4RL described above are connected to the occupant detection ECU 5.

The occupant detection ECU 5 is a control device composed of an input/output device, a CPU, a RAM, and the like (not shown).

The occupant detection ECU 5 includes an occupant decision section 51, a threshold value setting section 52, a CRS changing section 53, and a load calculation section 54.

The occupant detection ECU 5 will be described in detail below.

The load calculating section 54 is connected to the load sensors 4FR to 4RL.

The load calculation section 54 corresponds to a buckle load calculation section.

The load calculating section 54 calculates a decision load Wtt based on th2 loads Wfr to Wrl detected by the load sensors 4FR to 4RL.

Although the decision load Wtt according to the present embodiment is equal to a sum of the loads Wfr to Wrl (i.e., Wtt=Wfr+Wrr+Wfl+Wrl is satisfied), it is not limited thereto.

For example, an average value of the loads Wfr to Wrl may be used as the decision load Wtt.

Further, the load calculation section 54 calculates a buckle load Wb, which is a load of the right side of the seat cushion 81 where the buckle 85e is disposed, based on the loads Wfr, Wrr detected by the load sensors 4FR, 4RR disposed on the right side of the vehicle seat 8.

Although the buckle load Wb according to the present embodiment is equal to the sum of Wfr, Wrr (i.e., Wb=Wfr+Wrr is satisfied), it is not limited thereto.

For example, an average value of the load Wfr and the load Wrr may be used as the buckle load Wb.

The CRS changing section 53 is connected to the occupant decision section 51, the threshold value setting section 52, the load calculation section 54, the ignition switch 2, and the buckle switch 3.

The CRS changing section 53 corresponds to a child decision section.

When the occupant decision section 51 decides that a small-build adult is seated in the vehicle seat 8 based on the calculated decision load Wtt, the CRS changing section 53 prohibits the occupant decision section 51 from changing to the decision result of a small-build adult being seated when a predetermined condition is satisfied.

The predetermined condition is a case where an engagement of the tongue plate 85d with the buckle 85e is detected, and the buckle load Wb is less than predetermined buckle load thresholds Wbth1, Wbth2 inputted from the threshold setting section 52.

Less than the buckle load thresholds Wbth1, Wbth2 correspond to less than a buckle load threshold.

In this case, the CRS changing section 53 instructs the occupant decision section 51 to produce a decision result that the CRS 9 is attached on the vehicle seat 8.

The threshold setting section 52 is connected to the occupant decision section 51.

The threshold setting section 52 sets the buckle load thresholds Wbth1, Wbth2 described above according to the type of the occupant BH on the vehicle seat 8 decided by the occupant decision section 51.

That is, the threshold setting section 52 sets the buckle load threshold to Wbth1 in a state where a decision is changed to the decision result that the vehicle seat 8 is vacant.

On the other hand, the threshold setting section 52 sets the buckle load threshold to Wbth2 which is greater than Wbth1 in a state where a decision is changed to the decision result that the CRS 9 is attached on the vehicle seat 8.

The threshold setting section 52 transmits the buckle load thresholds Wbth1, Wbth2 that have been set to the CRS changing section 53.

The occupant decision section 51 decides the type of the occupant BH on the vehicle seat 8 to be at least either one of the states that the seat is vacant, the CRS 9 is attached, or the adults is seated based on the decision load Wtt inputted via the CRS changing section 53.

Here, when a state where an adult is seated in the vehicle seat 8 is decided, a state where a large-build adult being seated in the vehicle seat 8 is decided and a state where a small-build adult being seated in the vehicle seat 8 is decided are included.

The occupant decision section 51 either maintains or changes the current decision result based on the decision result of the type of the occupant BH.

As described above, the occupant decision section 51 is prohibited from changing to the decision result that a small-build adult is seated by the CRS changing section 53 when a certain condition is satisfied, and is changed to the decision result that the CRS 9 is attached on the vehicle seat 8.

[Configuration and Function of Occupant Protection ECU and Occupant Protection Device]

Next, configuration and function of an occupant protection ECU 6 and an occupant protection device 7 connected to the occupant detection ECU 5 will be described based on FIG. 2.

The occupant protection ECU 6 connected to the occupant detection ECU 5 is a control device composed of an input/output device, a CPU, a RAM and the like similar to the occupant detection ECU 5.

The occupant protection ECU 6 includes a protection device control section 61 and a collision decision section 62.

The protection device control section 61 is connected to the collision decision section 62 and the occupant protection device 7.

Various devices such as an air bag device and a seat belt pre-tensioner are included in the occupant protection device 7.

When an occurrence of a collision of the vehicle VE is detected by the collision decision section 62, the protection device control section 61 protects the occupants of the vehicle VE by operating the occupant protection device 7.

The protection device control section 61 is connected to the occupant decision section 51 of the occupant detection ECU 5, and selects a method of operation of the air bag device included in the occupant protection device 7 based on the decision result of the type of the occupant BH being changed by the occupant decision section 51.

Specifically, when it is decided that the vehicle seat 8 is vacant or the CRS 9 is secured on the vehicle seat 8, the airbag device is not deployed.

In addition, when it is decided that a small-build adult is seated in the vehicle seat 8, the airbag device is to be in a weakly deployed state.

Moreover, when it is decided that a large-build adult is seated in the vehicle seat 8, the airbag device is to be in a strongly deployed state.

[Characteristics of the Load to be Detected in the Vehicle Seat]

Figure 3:
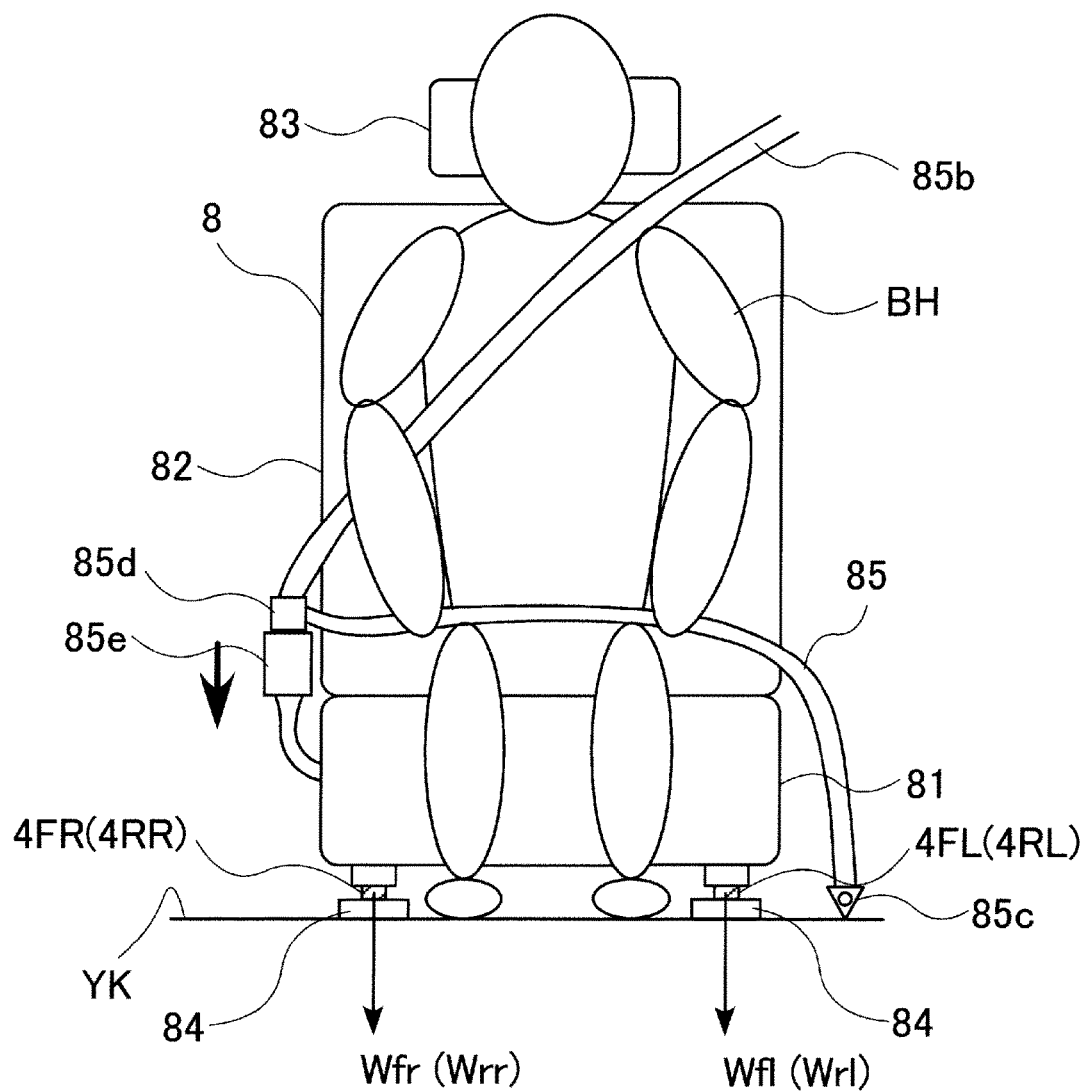
FIG. 3 shows a schematic front view of a state where an adult is seated in the vehicle seat shown in FIG. 1 and a seat belt device is worn.
Figure 4:
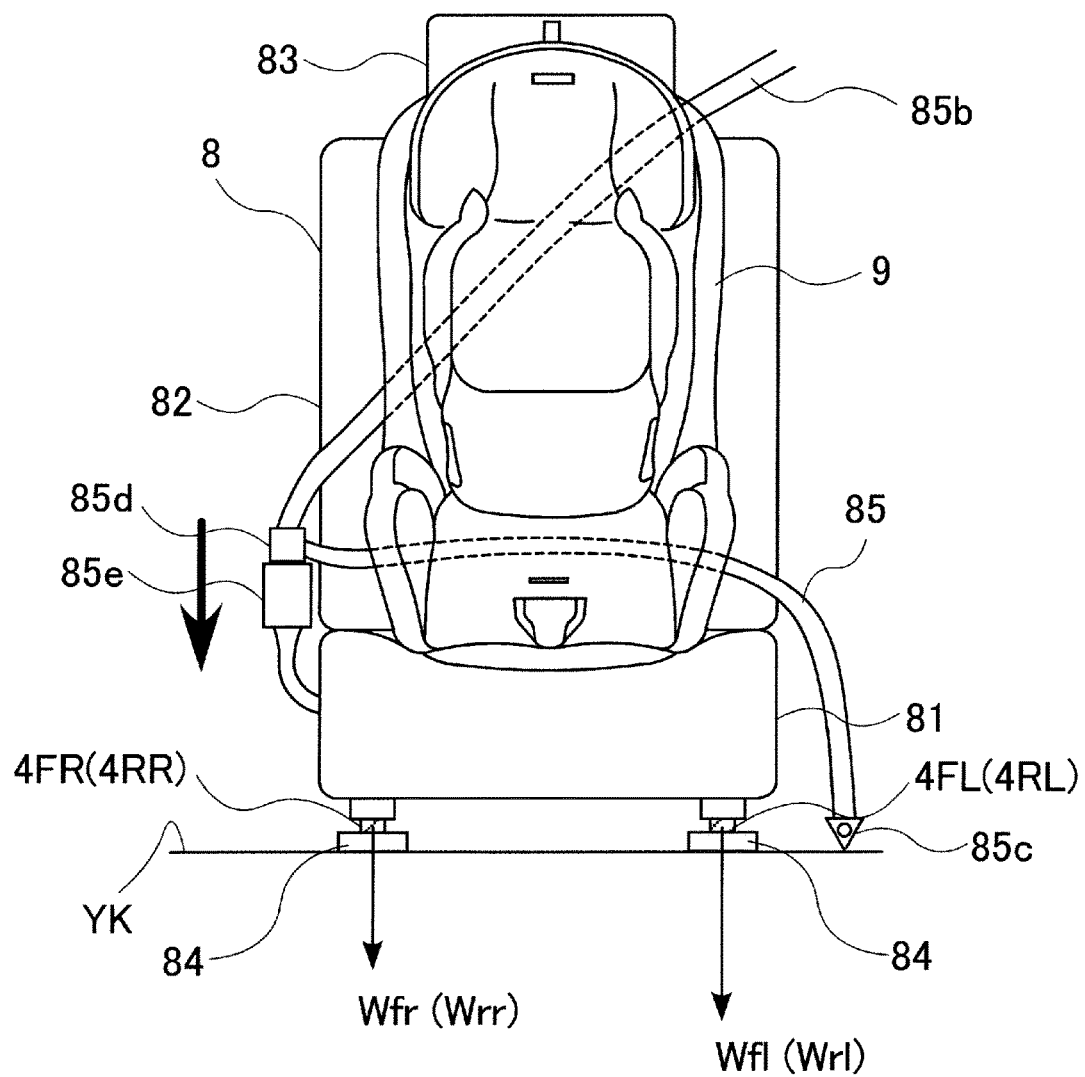
FIG. 4 shows a schematic front view of a state where a child seat is attached to the vehicle seat, and is secured by the seat belt device.
Figure 5:
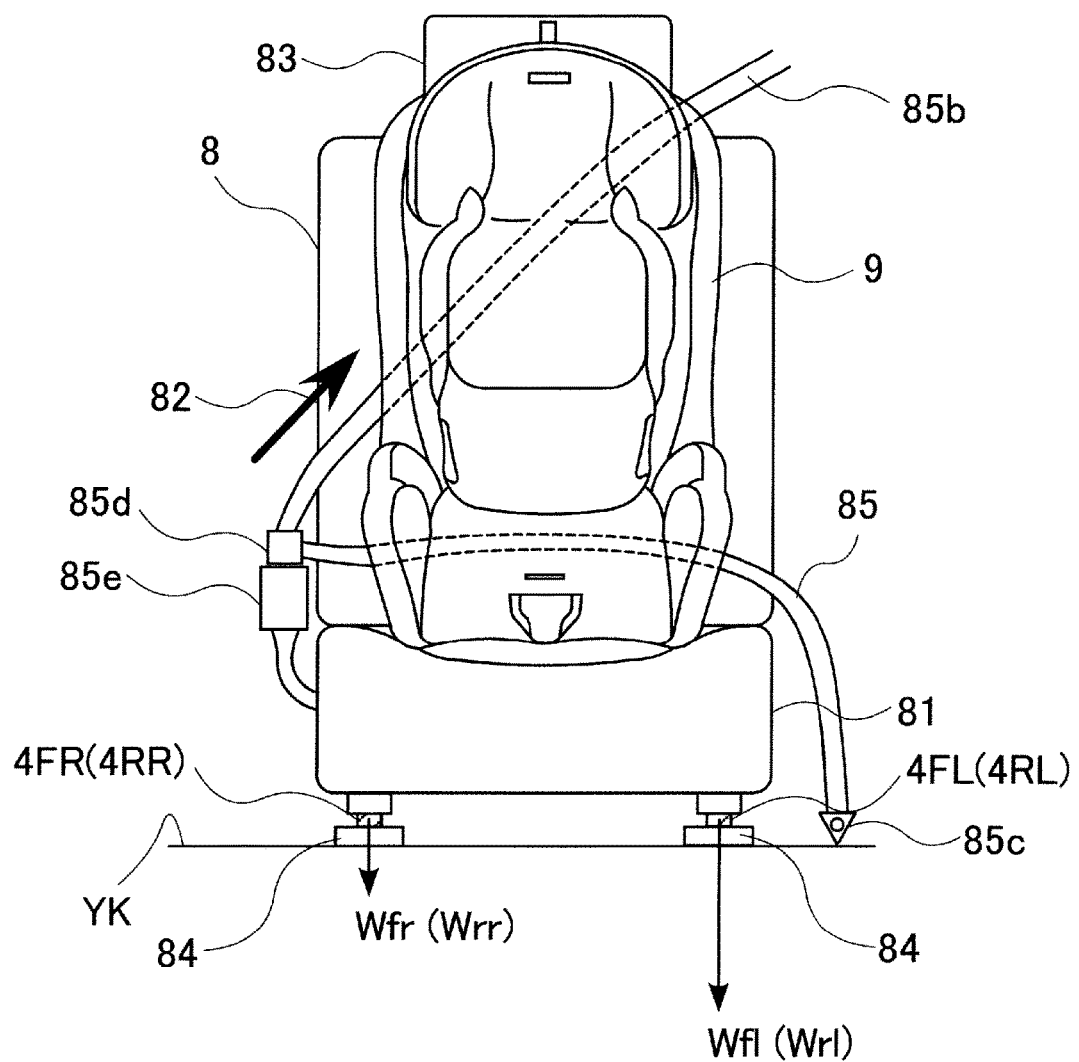
FIG. 5 shows a schematic front view of a state in which a webbing of the seat belt device is pulled upwards in the vehicle seat shown in FIG. 4.

Next, characteristics of the loads Wfr to Wrl detected by the load sensors 4FR to 4RL in a case where an adult is seated in the vehicle seat 8, and a case where the CRS 9 is attached on the vehicle seat 8 with reference to FIGS. 3 to 5.

As shown in FIG. 3, when the occupant BH, which is an adult is seated an on the vehicle seat 8 and the seat belt device 85 is worn, the detected loads Wfr to Wrl will not increase much more than the weight of the occupant BH by engaging the tongue plate 85d to the buckle 85e.

In contrast, as shown in FIG. 4, when the CRS 9 is disposed on the vehicle seat 8 and is secured by the seat belt device 85, the CRS 9 will be tightened strongly by a portion of the webbing 85b between the outer anchor 85c and the tongue plate 85d.

For this reason, the detected loads Wr to Wrl will increase considerably.

In particular, when the outer anchor 85c of the seat belt device 85 is fixed to the floor YK of the vehicle VE, and the load sensors 4FR to 4RL are attached to the respective left and right side of the vehicle seat 8, large loads Wfl, Wrl will be detected on the left side of the vehicle seat 8 where the buckle 85e is not provided.

Due to the increase of the detected loads Wfr to Wrl when securing the CRS 9, the decision load Wtt will increase to an extent of the decision load Wtt when an adult is seated in the vehicle seat 8.

As shown in FIG. 5, after the CRS 9 is secured, the webbing 85b of the seat belt device 85 engaged with the CRS 9 will be pulled upward by the retractor in a direction where slack is eliminated.

At this time, since the buckle 85e is connected to the seat cushion 81, the seat cushion 81 will also be pulled upward through the buckle 85e.

Accordingly, the loads Wfr, Wrr in the right side of the seat cushion where the buckle 85e is provided 81 will be reduced. Thereby the buckle load Wb will also be reduced.

On the other hand, at this time, the CRS 9 is fastened by the webbing 85b so that the loads Wfl, Wrl in the left side will increase.

A reduced amount of buckle load Wb that occurs after the CRS 9 is attached to the vehicle seat 8 has been found empirically to increase as the CRS 9 is tightened strongly by the webbing 85b when attaching the CRS 9 to the vehicle seat 8.

[Method of Controlling the Occupant Decider]

Hereinafter, a control method of the occupant decider 1 will be described with reference to FIGS. 6 to 9.

It should be noted that a small-build adult is described as an adult S, and a large-build adult is described as an adult L in FIGS. 6 to 9.

When the ignition switch 2 of the vehicle VE is turned on and the occupant decider 1 is activated, the occupant decision section 51 sets the type of the occupant BH on the vehicle seat 8 to a vacancy, and changes it to the decision result in step S101.

Then, in step S102, the detected loads Wfr to Wrl and the buckle signal BSW are inputted.

Next, in step S103, it is decided whether it is in a state of being changed to a decision result where the vehicle seat 8 is currently in a vacant state.

Figure 7:
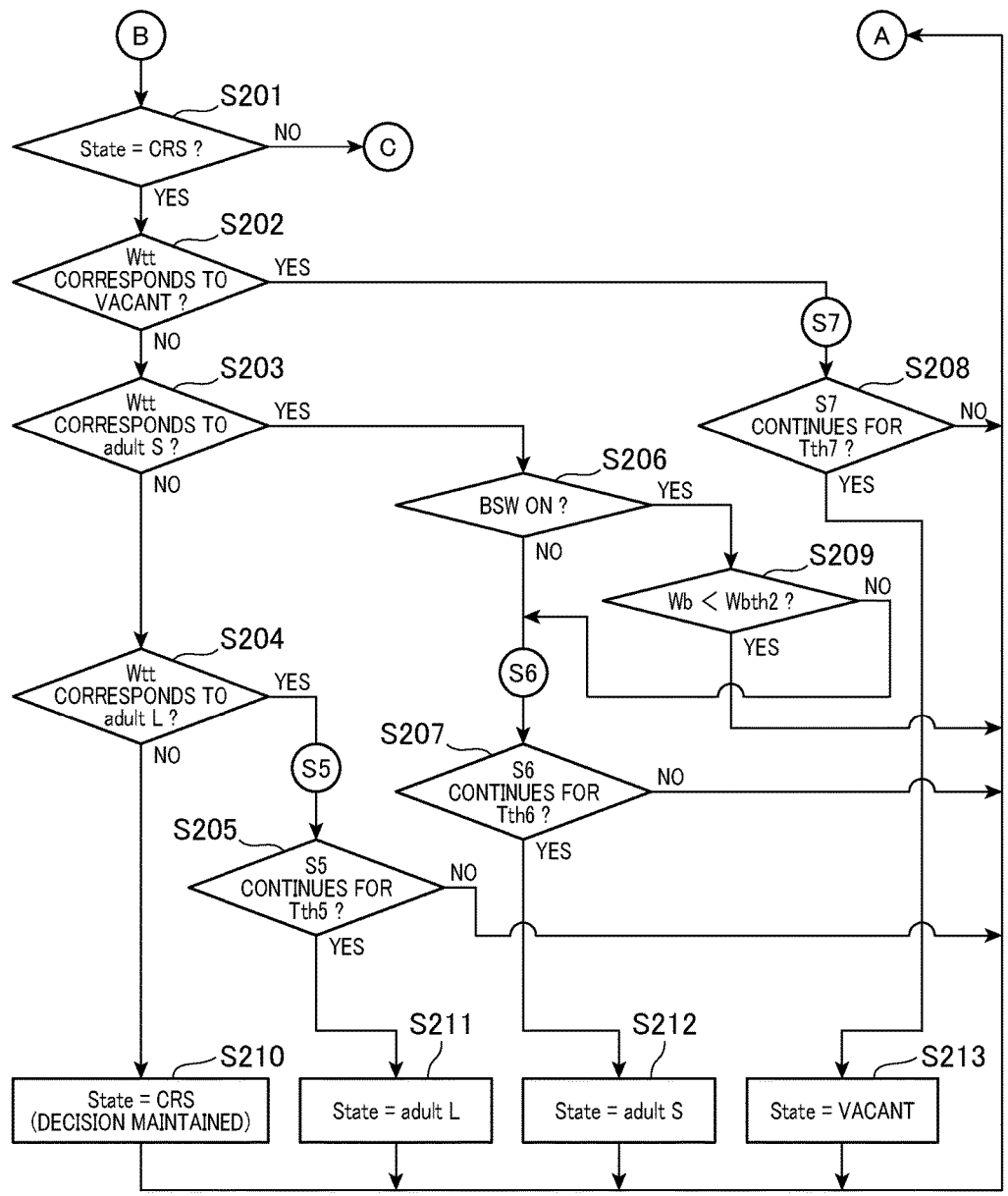
FIG. 7 shows a type decision flow chart in a state of being changed to a decision result that the vehicle seat is in a state where the child seat is secured thereon.

If a decision is not changed to the decision result that the vehicle seat 8 is currently in the vacant state, the process proceeds to step S201 shown in FIG. 7.

If a decision is changed to the decision result that the vehicle seat 8 is currently in the vacant state in the occupant decision section 51, a buckle load threshold is set to Wbth1 by the threshold setting section 52.

Then, in step S104, it is decided whether the decision load Wtt calculated by the load calculating section 54 corresponds to the state where the CRS 9 is attached on the vehicle seat 8.

If the decision load Wtt does not correspond to the state where the CRS 9 is attached on the vehicle seat 8, it is decided whether the decision load Wtt corresponds to a state where a small-build adult is seated in the vehicle seat 8 in step S105.

If the decision load Wtt does not correspond to the state where a small-build adult is seated in the vehicle seat 8, it is decided whether the decision load Wtt corresponds to a state where a large-build adult is seated in the vehicle seat 8 in step S106.

If the decision load Wtt does not correspond to the state where a large-build adult is seated in the vehicle seat 8, a decision result that the vehicle seat 8 is in the vacant state is maintained in step S113.

If it is decided that the decision load Wtt corresponds to the state where a large-build adult is seated in the vehicle seat 8 in step S106, it is decided whether a present state S1 has continued for a predetermined time Tth1 in step S107.

If the state S1 has continued for the predetermined time Tth1, a decision is changed to a decision result that it is in the state where a large-build adult is seated in the vehicle seat 8 in step S114.

If the state S1 has not continued for the predetermined time Tth1, the process returns to step S102.

If the decision is made that the decision load Wtt corresponds to the state where a small-build adult is seated in the vehicle seat 8 in step S105, the CRS changing section 53 decides whether the buckle 85e and the tongue plate 85d of the seat belt device 85 are engaged in step S108.

If it is decided that the buckle 85e and the tongue plate 85d are engaged, the CRS changing section 53 decides whether the buckle load Wb is less than the buckle load threshold Wbth1 in step S110.

If the buckle load Wb is less than the buckle load threshold Wbth1, it is decided whether a present state S3 has continued for a predetermined time Tth3 in step S111.

If the state S3 has continued for the predetermined time Tth3, the occupant decision section 51 prohibits the decision result from changing that a small-build adult is seated in the vehicle seat 8, and a decision is changed to the decision result that the CRS 9 is being attached on the vehicle seat 8 in step S116.

If the state S3 has not continued for the predetermined time Tth3, the process returns to step S102.

If it is decided that the buckle 85e and the tongue plate 85d are not engaged in step S108, or if it is decided that the buckle load Wb is equal to or more than the buckle load threshold Wbth1 in step S110, the process proceeds to step S109.

Then, in step S109, it is decided whether a present state S2 has continued for a predetermined time Tth2.

If the state S2 has continued for the predetermined time Tth2, a decision is changed to a decision result that it is in the state where a small-build adult is seated in the vehicle seat 8 in step S115.

If the state S2 has not continued for the predetermined time Tth2, the process returns to step S102.

In step S104, if it is decided that the decision load Wtt corresponds to a state where the CRS 9 is attached on the vehicle seat 8, it is decided whether a present state S4 has continued for a predetermined time Tth4 in step S112.

If the state S4 has continued for the predetermined time Tth4, a decision is changed to a decision result that is in a state where the CRS 9 is attached on the vehicle seat 8 in step S116.

If the state S4 has not continued for the predetermined time Tth4, the process returns to step S102.

In step S103, if it is decided that the vehicle seat 8 is not in the vacant state, the process proceeds to step S201 shown in FIG. 7.

Then, in step S201, it is decided whether it is changed to a decision result that the CRS 9 is currently in a state of being attached on the vehicle seat 8.

Figure 8:
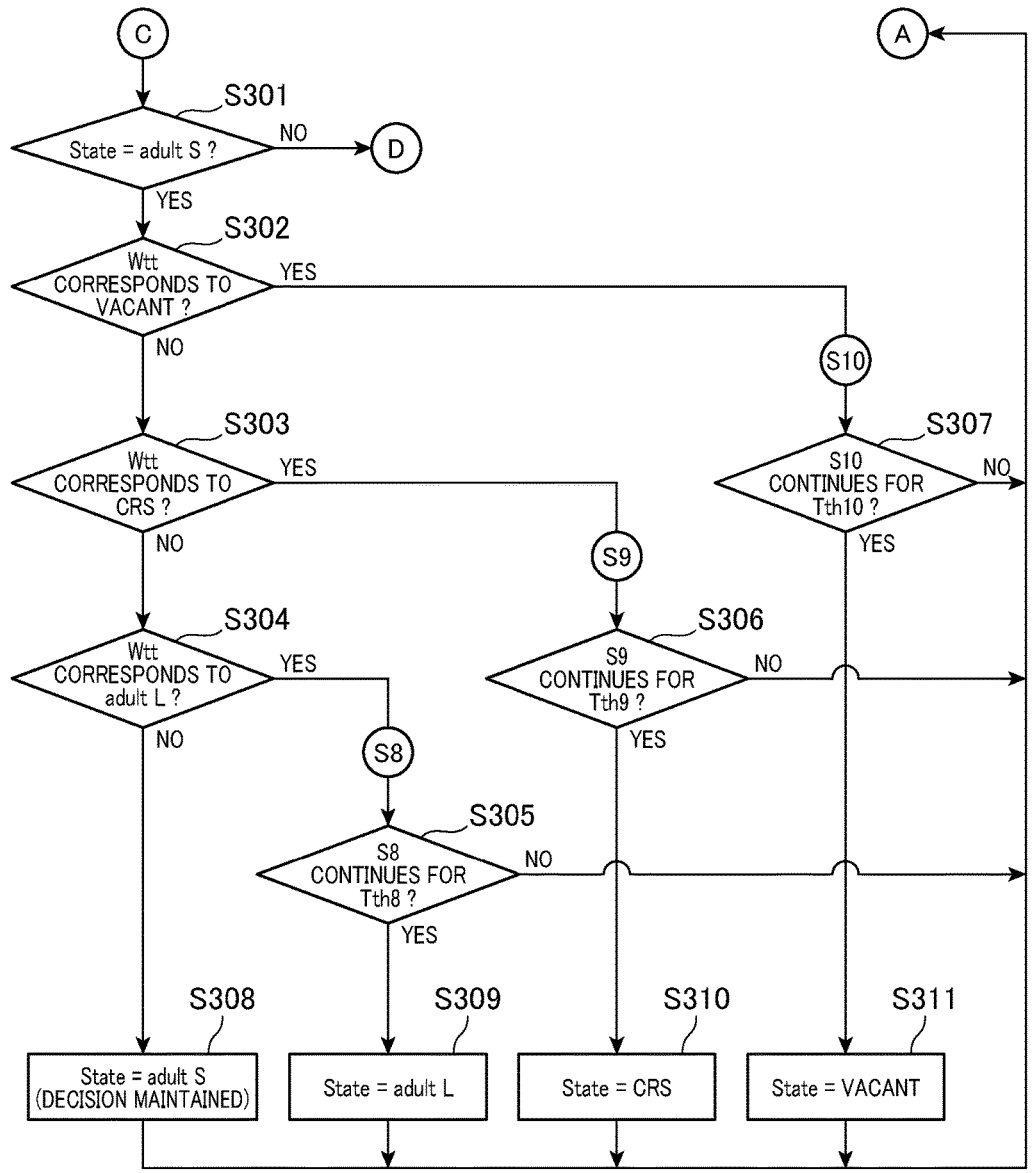
FIG. 8 shows a type decision flow chart in a state of being changed to a decision result that the vehicle seat is in a state where a small-build adult is seated thereon.

If a decision is not changed to the decision result that the CRS 9 is currently in the state of being attached on the vehicle seat 8, the process proceeds to step S301 shown in FIG. 8.

If a decision is changed to the decision result that the CRS 9 is currently in the state of being attached on the vehicle seat 8 in the occupant decision section 51, the buckle load threshold is set to Wbth2 by the threshold setting section 52.

The buckle load threshold Wbth2 is set larger than the buckle load threshold Wbth1.

In other words, an inequality Wbth2>Wbth1 is satisfied.

Then, in step S202, it is decided whether the decision load Wtt calculated by the load calculating section 54 corresponds to the vacant state of the vehicle seat 8.

If the decision load Wtt does not correspond to the vacant state of the vehicle seat 8, it is decided whether the decision load Wtt corresponds to a state where a small-build adult is seated in the vehicle seat 8 in step S203.

If the decision load Wtt does not correspond to the state where a small-build adult is seated in the vehicle seat 8, it is decided whether the decision load Wtt corresponds to a state where a large-build adult is seated in the vehicle seat 8 in step S204.

If the decision load Wtt does not correspond to the state where a large-build adult is seated in the vehicle seat 8, the decision result in the state where the CRS 9 is attached on the vehicle seat 8 is maintained in step S210.

If it is decided that the decision load Wtt corresponds to the state where a large-build adult is seated in the vehicle seat 8 in step S204, it is decided whether a present state S5 is has continued for a predetermined time Tth5 in step S205.

If the state S5 has continued for the predetermined time Tth5, a decision is changed to a decision result that it is in the state where a large-build adult is seated in the vehicle seat 8 in step S211.

If the state S5 has not continued for the predetermined time Tth5, the process returns to step S102.

If the decision load Wtt corresponds to the state where a small-build adult is seated in the vehicle seat 8 in step S203, the CRS changing section 53 decides whether the buckle 85e and the tongue plate 85d are engaged in step S 206.

If it is decided that the buckle 85e and the tongue plate 85d are engaged, the CRS changing section 53 decides whether the buckle load Wb is less than the buckle load threshold Wbth2 in step S209.

If the buckle load Wb is less than the buckle load threshold Wbth2, the process returns to step S102.

Therefore, the occupant decision section 51 prohibits the decision result from changing that a small-build adult is seated in the vehicle seat 8, and the decision is changed to the decision result that the CRS 9 is being attached on the vehicle seat 8

If it is decided the buckle 85e and the tongue plate 85d are not engaged in step S206, or if it is decided that the buckle load Wb is equal to or more than the buckle load threshold Wbth2 in step S209, the process proceeds to step S207.

Then, in step S207, it is decided whether a present state S6 has continued for a predetermined time Tth6.

If the state S6 has continued for the predetermined time Tth6, a decision is changed to a decision result that it is in the state where a small-build adult is seated in the vehicle seat 8 in step S212.

If the state S6 has not continued for the predetermined time Tth6, the process returns to step S102.

In step S202, if it is decided that the decision load Wtt corresponds to a state where the vehicle seat 8 is vacant, it is decided whether a present state S7 has continued for a predetermined time Tth7 in step S208.

If the state S7 has continued for the predetermined time Tth7, a decision is changed to a decision result that is in a state where the vehicle seat 8 is vacant in step S213.

If the state S7 has not continued for the predetermined time Tth7, the process returns to step S102.

In step S201, if it is decided that it is not changed to a decision result that the CRS 9 is currently in a state of being attached on the vehicle seat 8, the process proceeds to step S301 shown in FIG. 8.

Then, in step S301, it is decided whether it is changed to a decision result in a state where a small-build adult is currently seated in the vehicle seat 8.

Figure 9:
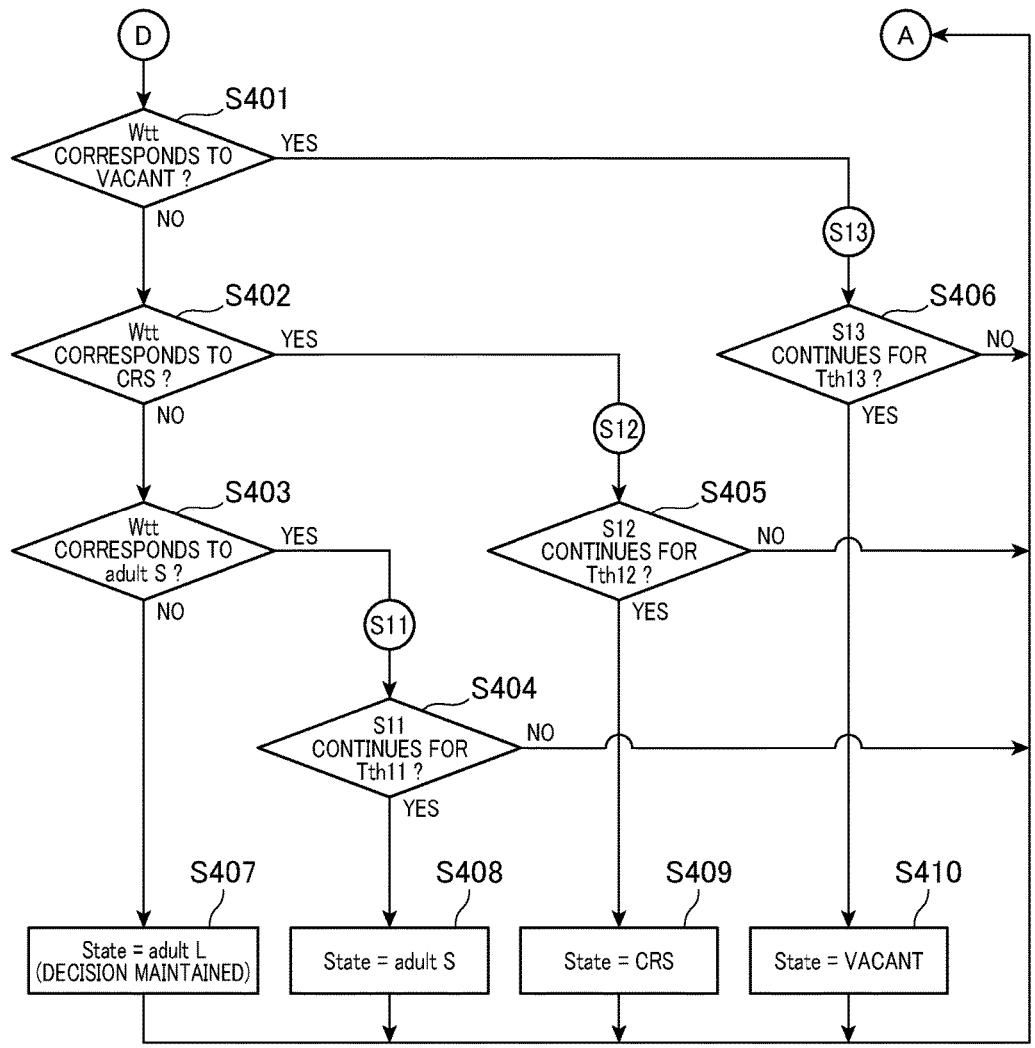
FIG. 9 shows a type decision flow chart in a state of being changed to a decision result that the vehicle seat is in a state where a large-build adult is seated thereon.

If a decision is not changed to the decision result that it is in the state where a small-build adult is currently seated in the vehicle seat 8, the process proceeds to step S401 shown in FIG. 9.

If a decision is changed to the decision result that it is in the state where a small-build adult is currently seated in the vehicle seat 8 in the occupant decision section 51, it is decided whether the decision load Wtt calculated by the load calculating section 54 corresponds to the vacant state of the vehicle seat 8.

If the decision load Wtt does not correspond to the vacant state of the vehicle seat 8, it is decided whether the decision load Wtt corresponds to a state where the CRS 9 is attached on the vehicle seat 8 in step S303.

If the decision load Wtt does not correspond to the state where the CRS 9 is attached on the vehicle seat 8, it is decided whether the decision load Wtt corresponds to a state where a large-build adult is seated in the vehicle seat 8 in step S304.

If the decision load Wtt does not correspond to the state where a large-build adult is seated in the vehicle seat 8, a decision result that the stare where a large-build adult is seated in the vehicle seat 8 is maintained in step S308.

In step S304, if the decision load Wtt corresponds to the state where a large-build adult is seated in the vehicle seat 8, it is decided whether a present state S8 has continued for a predetermined time Tth8 in step S305.

If the state S8 has continued for the predetermined time Tth8, a decision is changed to a decision result that it is in the state where a large-build adult is seated in the vehicle seat 8 in step S309.

If the state S8 has not continued for the predetermined time Tth8, the process returns to step S102.

In step S303, if the decision load Wtt corresponds to the state where the CRS 9 is attached on the vehicle seat 8, it is decided whether a present state S9 has continued for a predetermined time Tth9 in step S306.

If the state S9 has continued for the predetermined time Tth9, a decision is changed to a decision result that it is in the state where the CRS 9 is attached on the vehicle seat 8 in step S310.

If the state S9 has not continued for the predetermined time Tth9, the process returns to step S102.

In step S302, if it is decided that the decision load Wtt corresponds to a state where vehicle seat 8 is vacant, it is decided whether a present state S10 has continued for a predetermined time Tth10 in step S307.

If the state S10 has continued for the predetermined time Tth10, a decision is changed to a decision result that is in a state where the vehicle seat 8 is vacant in step S311.

If the state S10 has not continued for the predetermined time Tth10, the process returns to step S102.

In step S301, if it is decided that it is not changed to a decision result in a state where a small-build adult is seated in the vehicle seat 8, the process proceeds to step S401 shown in FIG. 9.

Then, in step S401, it is decided whether the decision load Wtt calculated by the load calculating section 54 corresponds to the vacant state of the vehicle seat 8.

At this time, a decision had been changed to a decision result that it is in the state where a large-build adult is seated in the vehicle seat 8 in the occupant decision section 51.

If the decision load Wtt does not correspond to the vacant state of the vehicle seat 8, it is decided whether the decision load Wtt corresponds to a state where the CRS 9 is attached on the vehicle seat 8 in step S402.

If the decision load Wtt does not correspond to the state where the CRS 9 is attached on the vehicle seat 8, it is decided whether the decision load Wtt corresponds to a state where a small-build adult is seated in the vehicle seat 8 in step S403.

If the decision load Wtt does not correspond to the state where a small-build adult is seated in the vehicle seat 8, the decision result in the state where a large-build adult is seated in the vehicle seat 8 is maintained in step S407.

If it is decided that the decision load Wtt corresponds to the state where a large-build adult is seated in the vehicle seat 8 in step S403, it is decided whether a present state S11 is has continued for a predetermined time Tth11 in step S404.

If the state S11 has continued for the predetermined time Tth11, a decision is changed to a decision result that it is in the state where a large-build adult is seated in the vehicle seat 8 in step S408.

If the state S11 has not continued for the predetermined time Tth11, the process returns to step S102.

In step S402, if the decision load Wtt corresponds to the state where the CRS 9 is attached on the vehicle seat 8, it is decided whether a present state S12 has continued for a predetermined time Tth12 in step S405.

If the state S12 has continued for the predetermined time Tth12, a decision is changed to a decision result that it is in the state where the CRS 9 is attached on the vehicle seat 8 in step S409.

If the state S12 has not continued for the predetermined time Tth12, the process returns to step S102.

In step S401, if it is decided that the decision load Wtt corresponds to a state where vehicle seat 8 is vacant, it is decided whether a present state S13 has continued for a predetermined time Tth13 in step S406.

If the state S13 has continued for the predetermined time Tth13, a decision is changed to a decision result that is in a state where the vehicle seat 8 is vacant in step S410.

If the state S13 has not continued for the predetermined time Tth13, the process returns to step S102.

As shown in FIGS. 8 and 9, in the state of being changed to the decision result that an adult is seated in the vehicle seat 8, there may be a case where the decision load Wtt is still decided to correspond to the state where a large-build adult is seated in the vehicle seat 8.

In this case, the CRS changing section 53 maintains the decision result to the occupant decision section 51 that an adult is seated in the vehicle seat 8 regardless of the presence or absence of the engagement of the buckle 85e and the buckle load Wb.

<Function and Effect of the First Embodiment>

According to the present embodiment, even if the CRS 9 is attached on the vehicle seat 8 and the loads Wfr to Wrl detected by the load sensors 4FR to 4RL are increased, the occupant decision section 51 is prevented from erroneously deciding that the adult is seating on the vehicle seat 8.

That is, after the CRS 9 is attached on the vehicle seat 8, the webbing 85b of the seat belt device 85 engaged with the CRS 9 is pulled upward by the retractor in a direction where a slack is eliminated.

Accordingly, the loads Wfr, Wrr in the left and right of the seat cushion 81 where the buckle 85e of the seat belt device 85 is present is reduced.

Therefore, it is possible to accurately decide that the CRS 9 is attached on the vehicle seat 8 by detecting the reduction of the buckle load Wb and the tongue plate 85d being engaged with the buckle 85e.

Further, a decision is changed to the decision result that the CRS 9 is attached on the vehicle seat 8 based on the presence or absence of the engagement of the tongue plate 85d with buckle 85e and the buckle load Wb.

Thus, it is not necessary to calculate the difference between the right and left load values described above, and the decision that the CRS 9 is attached on the vehicle seat 8 may be performed based on the loads Wfr, Wrr of the side where the buckle 85e of the vehicle seat 8 is disposed.

Therefore, it is possible to shorten the calculation time, it is possible to reduce the memory capacity of the occupant detection ECU 5.

Further, since variations of the detected values of the load sensors 4FR to 4RL can be suppressed from being only within variations of the loads Wfr, Wrr of the side where the buckle 85e of the vehicle seat 8 is disposed, a decision on the type of the occupant BH on the vehicle seat 8 can be performed accurately.

Further, when being changed in the state of the decision result where an adult is seated in the vehicle seat 8, the CRS changing section 53 maintains the decision result that an adult is seated in the vehicle seat 8 regardless of the presence or absence of the engagement of the buckle 85e and the buckle load Wb. This is shown in FIGS. 8 and 9.

Here, the decision result that an adult is seated in the vehicle seat 8 includes the decision result that a small-build adult is seated in the vehicle seat 8 and the decision result that a large-build adult is seated in the vehicle seat 8.

Thus, even if the buckle load Wb is reduced due to acceleration generated in the vehicle width direction in the state where a small-build adult or a large-build adult is seated in the vehicle seat 8, the decision is prevented from changing incorrectly to the decision result that the CRS 9 is attached on the vehicle seat 8.

In the vehicle VE, a case that the buckle load Wb is reduced due to the acceleration generated in the vehicle width direction corresponds a case that the occupant BH body is swung to one side in the lateral direction due to the acceleration in the vehicle width direction, and a side where the buckle 85e is provided is lifted from the vehicle seat 8.

As described above, when being changed in the state of the decision result where an adult is seated in the vehicle seat 8, the CRS changing section 53 maintains the decision result that an adult is seated in the vehicle seat 8 regardless of the presence or absence of the engagement of the buckle 85e and the buckle load Wb.

However, if the decision of the occupant decision section 51 has not been changed to any of the decision result of the type of the occupant BH yet based on the detected loads Wfr to Wrl after the ignition switch 2 has turned on, the decision result is made different from the above case.

That is, the above situation corresponds to a case where the ignition switch 2 of the vehicle the VE is once turned off, then the ignition switch 2 is turned on again in the state of being changed to the decision result that an adult is seated in the vehicle seat 8.

In addition, it is a case that the occupant decision section 51 has not been changed to any of the decision result of the type of the occupant BH yet based on the detected loads Wfr to Wrl after the ignition switch 2 has turned on In this case, the decision is forcibly changed to the decision result that the vehicle seat 8 is in the vacant state in step S101.

Figure 6:
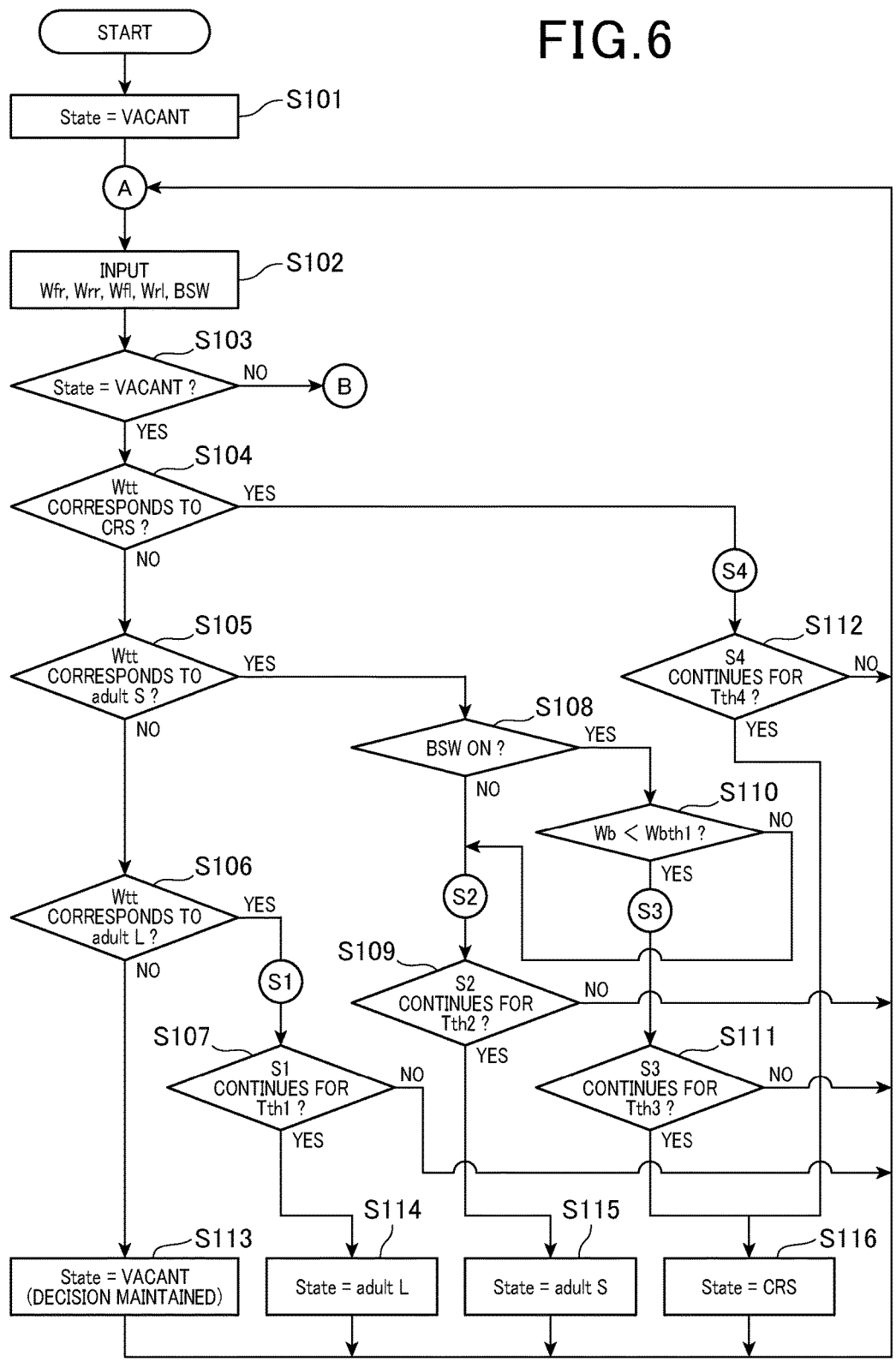
FIG. 6 shows a control flowchart executed by the occupant decision device for the vehicle according to the first embodiment, and shows a type decision flow chart in a state of being changed to a decision result that the vehicle seat is in a vacant state.

At this time, in a case where the decision is made that a small-build adult is seated in the vehicle seat 8, the passenger decision section 51 detects the engagement of the buckle 85e and the decrease of the buckle load Wb, and the decision is changed to the occupant decision section 51 that the decision result of the CRS 9 being attached on the vehicle seat 8. This is shown in FIG. 6.

Practically, if the decision is changed to the decision result of the adult is being seated in the vehicle seat 8 despite of the CRS 9 is being attached on the vehicle seat 8, an instrument panel (not shown) of the vehicle VE displays an indication that the occupant protection device 6 is operational.

At this time, the occupant BH of the vehicle VE may find it uncomfortable by looking at the display, and may be able to turn off the ignition switch 2.

Thus, if in case that the CRS 9 is actually attached on the vehicle seat 8, the decision can be changed to the correct decision result of the type of the occupant BH by temporarily turning off the ignition switch 2.

Further, the threshold setting section 52 increases the buckle load threshold to Wbth2 in a state of being changed to the decision result that the CRS 9 is attached on the vehicle seat 8 as compared with a state where the decision is changed to the decision result that the vehicle seat 8 is in the vacant state.

Thus, once the decision is changed to the decision result that the CRS 9 is attached on the vehicle seat 8, the decision result can be made easier to maintain, thereby improving the reliability of the occupant decider 1.

Further, the CRS changing section 53 does not allow the decision to be changed to the decision result that the CRS 9 is attached on the vehicle seat 8 when the decision load Wtt is decided to correspond to the state where a large-build adult is seated in the vehicle seat 8. In this regard, it is shown in step S106 and step S204.

This is the same if the tongue plate 75e and the buckle 85e are engaged, and the buckle load Wb is less than the buckle load threshold Wbth1.

This is because the decision load Wtt is unlikely to be increased to correspond to the state where a large-build adult is seated in the vehicle seat 8 when attaching the CRS 9 on the vehicle seat 8.

Therefore, if the decision load Wtt is decided to correspond to the state where a large-build adult is seated in the vehicle seat 8, the decision is precluded from being changed to the decision result that the CRS 9 is attached on the vehicle seat 8, thereby improving the reliability of the occupant decider 1.

<Configuration of a Second Embodiment>

A control flowchart executed by an occupant decider 1 according to a second embodiment will be described with reference to FIG. 10.

Figure 10:
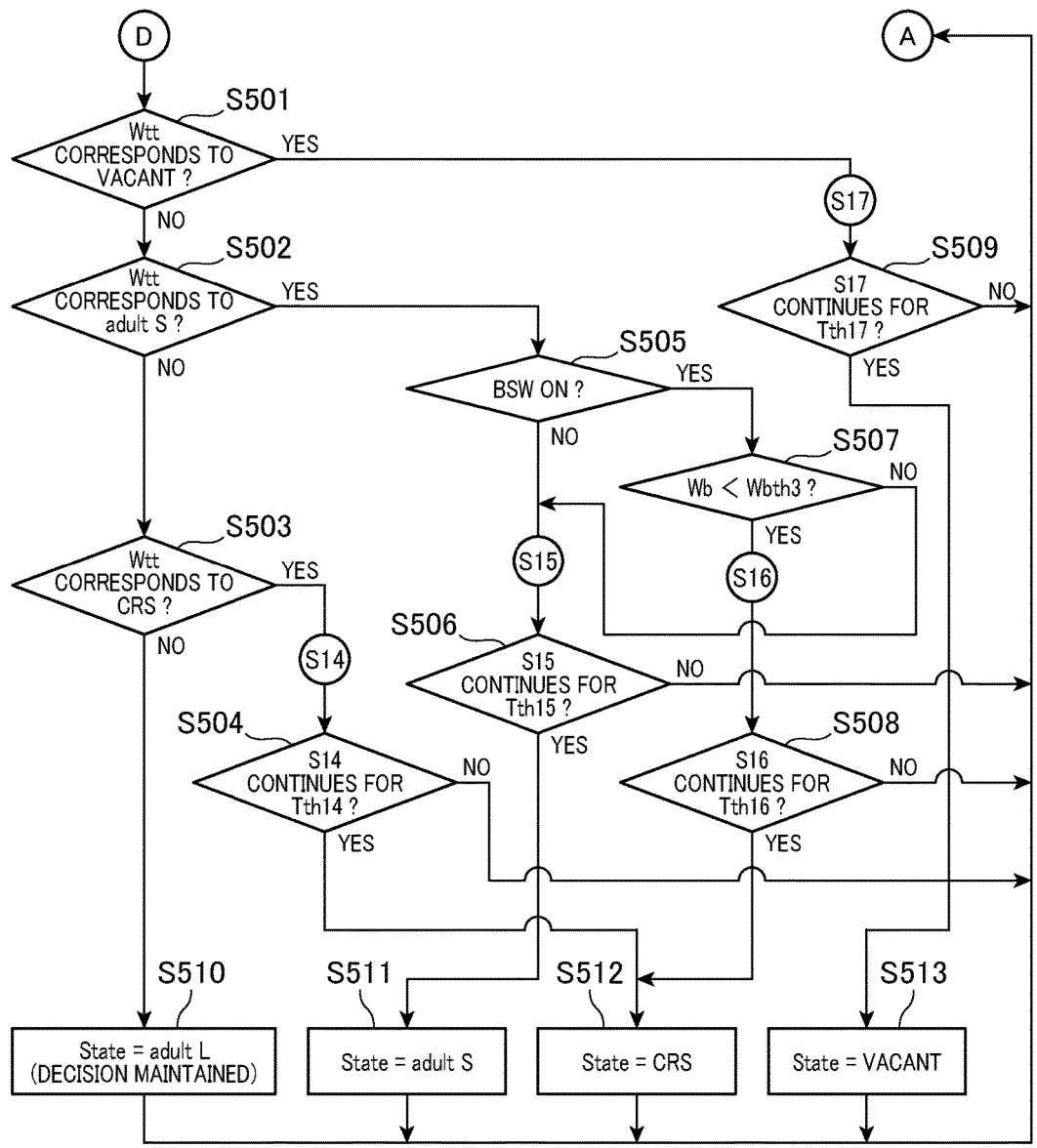
FIG. 10 shows a part of a control flowchart executed by an occupant decision device for the vehicle according to a second embodiment, and shows a type decision flow chart in a state of being changed to a decision result that the vehicle seat is in a state where a large-build adult is seated thereon.

A flowchart shown in FIG. 10 corresponds to the flow chart according to the first embodiment shown in FIG. 9, and shows a case where a decision is changed to a decision result that a large-build adult is seated in the vehicle seat 8.

Hereinafter, only different points substantially different from the flowchart shown in FIG. 9 will be described.

If the decision is changed to the decision result that a large-build adult is seated in the vehicle seat 8, the buckle load threshold is set to Wbth3 by the threshold setting section 52.

In the present embodiment, the threshold value setting section 52 corresponds to a threshold changing section.

The buckle load threshold Wbth3 is set smaller than the buckle load threshold Wbth1. In other words, an inequality Wbth3<Wbth1 is satisfied.

If the decision is made that the decision load Wtt corresponds to the state where a small-build adult is seated in the vehicle seat 8 in step S502, the CRS changing section 53 decides whether the buckle 85e and the tongue plate 85d of the seat belt device 85 are engaged in step S505.

If it is decided that the buckle 85e and the tongue plate 85d are engaged, the CRS changing section 53 decides whether the buckle load Wb is less than the buckle load threshold Wbth3 in step S507.

If the buckle load Wb is less than the buckle load threshold Wbth3, it is decided whether a present state S16 has continued for a predetermined time Tth16 in step S508.

If the state S16 has continued for the predetermined time Tth16, the occupant decision section 51 prohibits the decision result from changing that an adult is seated in the vehicle seat 8, and a decision is changed to the decision result that the CRS 9 is being attached on the vehicle seat 8 in step S512.

If the state S16 has not continued for the predetermined time Tth16, the process returns to step S102 shown in FIG. 6.

Since other steps shown in the flowchart in FIG. 10 are substantially the same as the steps of the flow chart shown in FIG. 9, description thereof is omitted.

In the above description, only a case where the decision is changed to the decision result that a large-build adult is seated in the vehicle seat 8 is described.

However, in the present embodiment, even in a case where the decision is changed to the decision result that a small-build adult is seated in the vehicle seat 8, the buckle load threshold is set to Wbth3 by the threshold setting section 52, and the same control shown in FIG. 10 is executed.

<Function and Effect of the Second Embodiment>

According to the present embodiment, the threshold setting section 52 reduces the buckle load threshold to Wbth3 in the state where the decision is changed to the decision result that a small-build adult or a large-build adult is seated in the vehicle seat 8.

Thus, in the state where the decision is changed such that an adult is seated in the vehicle seat 8, a subsequent decision that the CRS 9 is attached on the vehicle seat 8 is suppressed.

In the above description, the adult includes a small-build adult and a large-build adult.

Therefore, even if the buckle load Wb is reduced due to the acceleration generated in the vehicle width direction, the decision is prevented from being changed incorrectly to the decision result that the CRS 9 is attached on the vehicle seat 8.

<Other Embodiments>

The present disclosure is not limited to the above embodiments and may be modified or expanded as follows.

The number of the load sensors 4FR to 4RL disposed on the vehicle seat 8 may be any number, and it may be disposed at least one for each left and right sides of the vehicle seat 8.

When the occupant decision section 51 decides that the decision is in the state where an adult is seated in the vehicle seat 8 based on the loads Wfr to Wrl detected by the load sensors 4FR to 4RL, it is not necessary to distinguish between a large-build adult and a small-build adult.

Further, the occupant detection ECU 5 may be formed integrally with the occupant protection ECU 6.

Moreover, instead of the buckle switch 3, a camera device that photographs a vehicle interior may be used as the seat belt wearing detection body.

Furthermore, a part of or all of the functions executed by the occupant detection ECU5 may be hardware-configured by one or more ICs or the like.

In addition, the occupant decider 1 according to the present disclosure may be applied to a warning device to warn against the occupant when the seat belt device 85 is not worn.

What is claimed is:

1. An occupant decision device for a vehicle that has a vehicle seat provided with a seat belt device of which one end is fixed to a vehicle floor and a plurality of load sensors disposed on four corners of a seal cushion of the vehicle seat, the occupant decision device comprising:

first portion load detecting bodies comprising load sensors disposed on a first end portion of the vehicle seat that detect a first portion load of the vehicle seat;

second portion load detecting bodies comprising load sensors disposed on a second end portion of the vehicle seat that detect a second portion load of the vehicle seat;

an occupant decision section that decides a type of occupant on the vehicle seat from at least one of a state where the vehicle seat is vacant, a state where a child seat is attached, a state where a large-build adult is seated or a state where a small-build adult is seated based on the total load detected by the first and second portion load detecting bodies, and maintains or changes a decision result of the type of the occupant;

a seat belt wearing detection body that detects a tongue of the seat belt device being engaged with a buckle;

a buckle load calculation section that calculates a buckle load, which is the first portion load of the vehicle seat where the buckle is disposed, based on the first portion load detected by the first portion load detecting bodies; and a child decision section that prohibits the occupant decision section from changing a decision to a decision result that the small-build adult is seated in the vehicle seat and changes the decision to a decision result that the child seat is attached on the vehicle seat when an engagement of the tongue with the buckle is detected by the seat belt wearing detection body and the buckle load calculated by the buckle load calculation section is less than a predetermined buckling load threshold for a predetermined period of time in a case where the occupant decision section decides that the small-build adult is seated in the vehicle seat based on the total load detected by the first and second portion load detecting bodies, wherein the child decision section allows the decision result that small-build adult is seated in the vehicle seat when the buckle and the tongue have not been engaged for a predetermined time.

2. The occupant decision device for the vehicle according to claim 1, wherein the occupant decision device further includes a threshold setting section that increases a buckle load threshold in a state of being changed to the decision result that the child seat is attached on the vehicle seat as compared with a state where the decision is changed to the decision result that the vehicle seat is in a vacant state.

3. The occupant decision device for the vehicle according to claim 1, wherein, when the occupant decision section decides that an adult is seated in the vehicle seat based on the total load detected by the first and second portion load detecting bodies, a state where a large-build adult being seated in the vehicle seat is decided and a state where the small-build adult being seated in the vehicle seat is decided are included;

in a case where the occupant decision section decides that the small-build adult is being seated in the vehicle seat based on the total load detected by the first and second portion load detecting bodies, the child decision section instructs the occupant decision section to prohibit the decision from changing to the decision result that small-build adult is seated in the vehicle seat and instructs the occupant decision section to change the decision to the decision result that the child seat is attached on the vehicle seat when the engagement of the tongue with the buckle is detected by the seat belt wearing detection body and the buckle load calculated by the buckle load calculation section is less than the predetermined buckling load threshold for a predetermined period of time; and in a case where the occupant decision section decides that the large-build adult is being seated in the vehicle seat based on the total load detected by the first and second portion load detecting bodies corresponding to the large-built adult, the child decision section instructs the occupant decision section to change the decision to the decision result that the large-build adult is seated in the vehicle seat when the total load corresponding to the large-build adult continues for a predefined period of time.

4. The occupant decision device for the vehicle according to claim 1, wherein, the occupant decision device further includes a threshold changing section that reduces a buckle load threshold in the state where the decision is changed to the decision result that an adult is seated in the vehicle seat.

5. An occupant decision device for a vehicle that has a vehicle seat provided with a seat belt device of which one end is fixed to a vehicle floor and a plurality of load sensors disposed on four corners of a seat cushion of the vehicle seat, the occupant decision device comprising:
- first portion load detecting bodies comprising load sensors disposed on a first end portion of the seat that detect a first portion load of the vehicle seat;
- second portion load detecting bodies comprising load sensors disposed on a second end portion of the vehicle seat that detect a second portion load of the vehicle seat;
- an occupant decision section that decides a type of occupant on the vehicle seat from at least one of a state where the vehicle seat is vacant, a state where a child seat is attached, a state where a large-build adult is seated or a state where a small-build adult is seated based on the total load detected by the first and second portion load detecting bodies, and maintains or changes a decision result of the type of the occupant, and keeps the maintained or changed decision result as a state;
- a seat belt wearing detection body that detects a tongue of the seat belt device being engaged with a buckle;
- a buckle load calculation section that calculates a buckle load, which is the first portion load of the vehicle seat where the buckle is disposed, based on the first portion load detected by the first portion load detecting, bodies;
- a child decision section that prohibits the occupant decision section from changing a decision to a decision result that the small-build adult is seated in the vehicle seat and changes the decision to a decision result that the child seat is attached on the vehicle seat when an engagement of the tongue with the buckle is detected by the seat belt wearing detection body and the buckle load calculated by the buckle load calculation section is less than a predetermined buckling load threshold for a predetermined period of time in a case where the occupant decision section decides that the small-build adult is seated in the vehicle seat based on the total load detected by the first and second portion load detecting bodies, wherein, in the state where the decision is changed to the decision result that the small-build adult is seated in the vehicle seat, and in a case where the occupant decision section decides that small-build adult is still seated in the vehicle seat, the child decision section instructs the occupant decision section to maintain the decision result that small-build adult is seated in the vehicle seat when the engagement of the tongue with the buckle is detected by the seat belt wearing detection body and the buckle load calculated by the buckle load calculation section is less than the predetermined buckling load threshold for the predetermined period of time.

* * * * *